United States Patent
Kogane et al.

(10) Patent No.: US 7,532,237 B2
(45) Date of Patent: May 12, 2009

(54) MONITOR CAMERA DEVICE, CONTROL METHOD FOR MONITOR CAMERA DEVICE, AND PROGRAM FOR MONITOR CAMERA DEVICE

(75) Inventors: Haruo Kogane, Kanagawa (JP); Yasuji Nakamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 385 days.

(21) Appl. No.: 11/570,971

(22) PCT Filed: Jul. 6, 2005

(86) PCT No.: PCT/JP2005/012485

§ 371 (c)(1),
(2), (4) Date: Dec. 20, 2006

(87) PCT Pub. No.: WO2006/011340

PCT Pub. Date: Feb. 2, 2006

(65) Prior Publication Data

US 2008/0284862 A1 Nov. 20, 2008

(30) Foreign Application Priority Data

Jul. 28, 2004 (JP) .............................. 2004-219659

(51) Int. Cl.
H04N 5/225 (2006.01)
H04N 5/232 (2006.01)

(52) U.S. Cl. ............ 348/211.5; 348/211.8; 348/207.11; 725/105

(58) Field of Classification Search .............. 348/207.1, 348/207.11, 211.3, 211.4, 211.5, 211.14, 348/211.8; 725/105
See application file for complete search history.

(56) References Cited

U.S. PATENT DOCUMENTS

| | | | | |
|---|---|---|---|---|
| 5,745,223 A | * | 4/1998 | Ikeda | ....................... 348/211.5 |
| 5,896,171 A | * | 4/1999 | Suzuki | .................. 348/211.14 |
| 2003/0043281 A1 | | 3/2003 | Nakamura | |

(Continued)

FOREIGN PATENT DOCUMENTS

EP 0420289 4/1991

(Continued)

OTHER PUBLICATIONS

European Search Report Dated Dec. 20, 2007.

*Primary Examiner*—John M Villecco
(74) *Attorney, Agent, or Firm*—Pearne & Gordon LLP

(57) ABSTRACT

A camera (16) and a rotary base receiver (28) are connected to each other to be capable of transmitting a video signal. In the camera (16), a web server (50) sends out a video signal to the outside and receives a camera remote control signal and a rotary base remote control signal from the outside. A control unit (40) controls the camera (16) according to the camera remote control signal. The rotary base remote control signal is superimposed on a video signal to be transmitted to the rotary base receiver (28) by a video signal circuit (52). The rotary base receiver (28) extracts the rotary base remote control signal from the video signal, and controls a rotary base (14) according to the rotary base remote control signal. The configuration for a superimposed transmission can be utilized and both the camera and the rotary base can be controlled with ease through communications with the outside.

10 Claims, 6 Drawing Sheets

U.S. PATENT DOCUMENTS

2006/0066725 A1 * 3/2006 Dodrill et al. .......... 348/207.99

FOREIGN PATENT DOCUMENTS

| EP | 0516058 | | 12/1992 |
| EP | 0726673 | | 8/1996 |
| JP | 06284425 A | * | 10/1994 |
| JP | 08076244 A | * | 3/1996 |
| JP | 08-265623 | | 10/1996 |
| JP | 10341370 A | * | 12/1998 |
| JP | 11-243505 | | 9/1999 |
| JP | 2000295499 A | * | 10/2000 |
| JP | 2003284052 A | * | 10/2003 |
| JP | 2004-117973 | | 5/2004 |

* cited by examiner

MONITOR CAMERA DEVICE, CONTROL METHOD FOR MONITOR CAMERA DEVICE, AND PROGRAM FOR MONITOR CAMERA DEVICE

TECHNICAL FIELD

The present invention relates to a monitor camera device that enables remote control of a camera and a rotary base.

BACKGROUND ART

A monitor camera device configured to enable remote control has been used. For example, JP-A-11-243505 discloses a camera system of a superimposed transmission type. In this camera system, a remote control signal is superimposed on a video signal. The camera and the rotary base thereof are remote controlled according to the remote control signal.

FIG. 6 shows an example of the configuration of a monitor camera device in the related art. A monitor camera device 100 comprises a camera 102, a lens 104, a rotary base 106, a rotary base receiver 108, a coaxial cable 110, a system controller (control device) 112, and a TV monitor 114. The rotary base receiver 108 is provided to the rotary base 106, and it controls the rotary base 106 and the lens 104 (zoom lens or the like). The camera 102, the rotary base receiver 108, and the system controller 112 are cascade connected via the coaxial cable 110. A video signal from the camera 102 is supplied to the system controller 112 via the rotary base receiver 108.

A remote control signal is superimposed on a video signal and transmitted via the coaxial cable 110. In remote control, the system controller 112 side is the master device of operations. The camera 102 and the rotary base 106 are independent slave devices. A command to camera and a command to rotary base are transmitted as the remote control signal. The camera 102 performs its own operation upon receipt of a command to camera. Also, the rotary base receiver 108 and the rotary base 106 perform their own operations upon receipt of a command to rotary base.

In the configuration in the related art, power is also supplied to the camera side from the system controller 112 via the coaxial cable 110.

In the monitor camera device in the related art, however, in a case where a serial communication, such as RS485, is made available, or in a case where the monitor camera device is controlled using the IP protocol communication, such as Ethernet (registered trademark) and a telephone line, the circuit configuration for a superimposed transmission can no longer be used. Hence, the system configuration has to be changed considerably.

In addition, when the protocol communication described above or the like is made, respective devices (the camera and the rotary base receiver in the case above) need to have individual physical addresses as the destinations of control. This makes the control complicated. In particular, because a host authentication is required for each IP address in the IP network, each of the camera and the rotary base control device needs respective processing.

DISCLOSURE OF THE INVENTION

Problems that the Invention is to Solve

The invention was achieved under the circumstances described above. An object of the invention is therefore to provide a monitor camera device that can utilize the configuration for a superimposed transmission and control the camera and the rotary base with ease through communications with the outside.

Means for Solving the Problem

A monitor camera device of the invention includes a camera and a rotary base control unit connected to the camera and is capable of transmitting a video signal between the camera and the rotary base control unit within the monitor camera device, wherein the camera includes: an outside communication unit that sends out the video signal to an outside of the monitor camera device and receives a camera remote control signal and a rotary base remote control signal from the outside of the monitor camera device; a camera control unit that controls the camera according to the camera remote control signal; and a superimposition unit that superimposes the rotary base remote control signal on a video signal to be transmitted to the rotary base control unit within the monitor camera device, and the rotary base control unit includes an extraction unit that extracts the rotary base remote control signal from the video signal on which the rotary base remote control signal is superimposed, and controls a rotary base according to the rotary base remote control signal.

Another aspect of the invention is a control method for a monitor camera device having a camera and a rotary base control unit that are connected to each other and capable of transmitting a video signal between the camera and the rotary base control unit within the monitor camera device, wherein the camera sends out the video signal to an outside of the monitor camera device and receives a camera remote control signal and a rotary base remote control signal from the outside of the monitor camera device to control the camera according to the camera remote control signal while superimposing the rotary base remote control signal on a video signal to be transmitted to the rotary base control unit within the monitor camera device, and the rotary base control unit extracts the rotary base remote control signal from the video signal on which the rotary base remote control signal is superimposed and controls a rotary base according to the rotary base remote control signal.

Still another aspect of the invention is a program run on a computer of a camera in a monitor camera device having the camera and a rotary base control unit that are connected to each other and capable of transmitting a video signal between the camera and the rotary base control unit within the monitor camera device, and causing the computer to perform the following: sending out the video signal to an outside of the monitor camera device by means of an outside communication unit provided to the camera, acquiring a camera remote control signal and a rotary base remote control signal received at the outside communication unit from the outside of the monitor camera device, and controlling the camera according to the camera remote control signal while superimposing the rotary base remote control signal on a video signal to be transmitted to the rotary base control unit within the monitor camera device.

Still another aspect of the invention is a camera connected to a rotary base, including: an outside communication unit that sends out a video signal to an outside of the camera and receives a camera remote control signal and a rotary base remote control signal from the outside of the camera; a camera control unit that controls the camera according to the camera remote control signal; and a superimposition unit that superimposes the rotary base remote control signal on a video signal to be transmitted to the rotary base from the camera.

As will be described below, there are other aspects of the invention. The disclosure of the invention is therefore intended to provide part of the aspects of the invention, and is not intended to limit the scope of the invention described and claimed herein.

DESCRIPTION OF REFERENCE NUMERALS AND SIGNS

Figure 1:
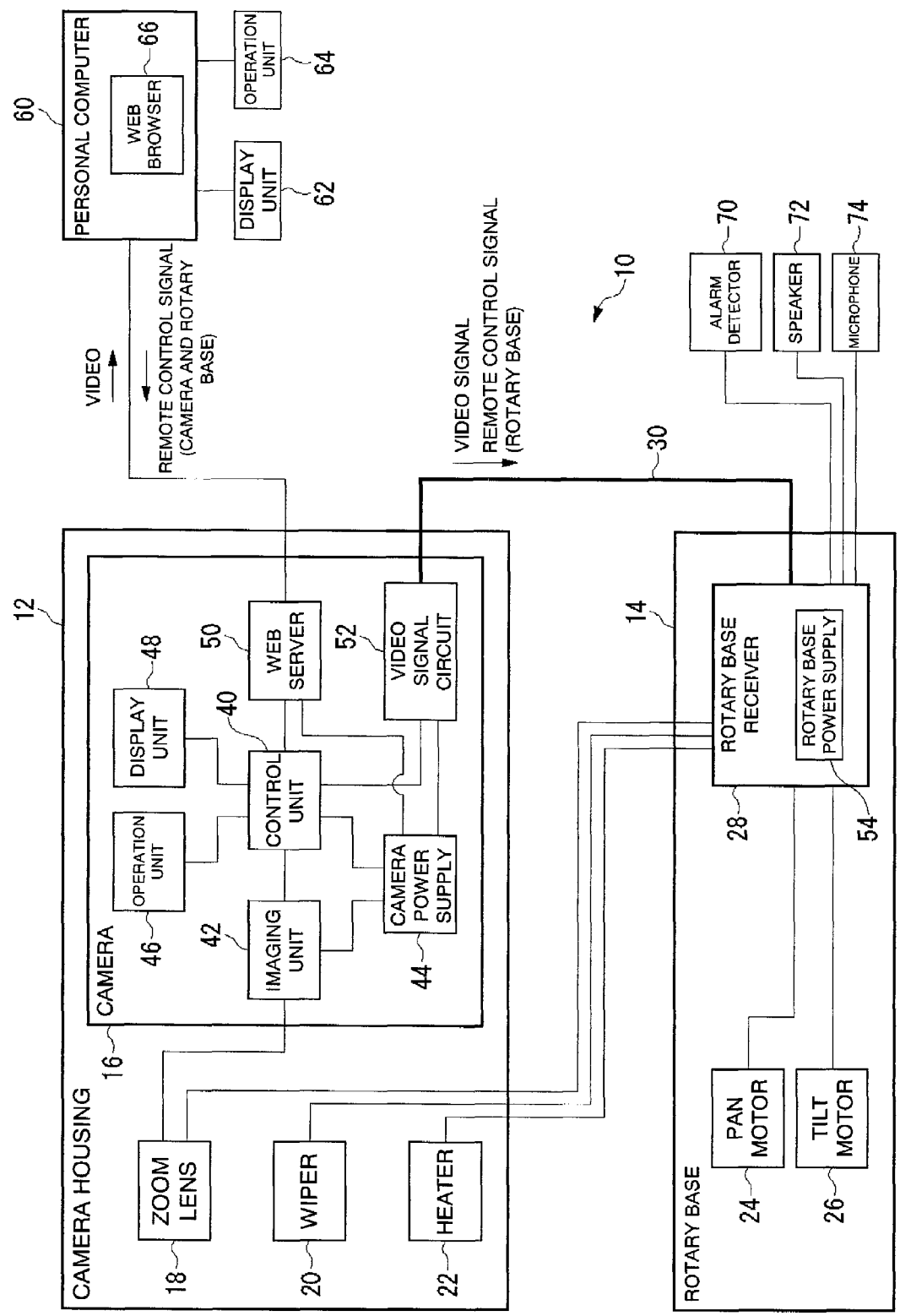
FIG. 1 is a block diagram of a monitor camera device according to a first embodiment of the invention.

10: monitor camera device
12: camera housing
14: rotary base
16: camera
18: zoom lens
20: wiper
22: heater
24: pan motor
26: tilt motor
28: rotary base receiver
30: coaxial cable
40: control unit
42: imaging unit
44: camera power supply
46: operation unit
48: display unit
50: web server
52: video signal circuit
54: rotary base power supply

BEST MODE FOR CARRYING OUT THE INVENTION

Hereinafter, the invention will be described in detail. It should be appreciated, however, that the following detailed description and the accompanying drawings are not intended to limit the invention. The scope of the invention is rather limited by the scope of the accompanying claims.

A monitor camera device of the invention includes a camera and a rotary base control unit connected to the camera and is capable of transmitting a video signal between the camera and the rotary base control unit within the monitor camera device, wherein the camera includes: an outside communication unit configured to send out the video signal to an outside of the monitor camera device and receives a camera remote control signal and a rotary base remote control signal from the outside of the monitor camera device; a camera control unit configured to control the camera according to the camera remote control signal; and a superimposition unit configured to superimpose the rotary base remote control signal on a video signal to be transmitted to the rotary base control unit within the monitor camera device, and the rotary base control unit includes an extraction unit configured to extract the rotary base remote control signal from the video signal on which the rotary base remote control signal is superimposed, and controls a rotary base according to the rotary base remote control signal.

According to this configuration, the camera receives the camera remote control signal and the rotary base remote control signal using the outside communication unit, and superimposes (multiplexes) the rotary base remote control signal on a video signal so as to be sent out to the rotary base control unit. Accordingly, the camera serves as the master device and is able to control the rotary base. Because the camera functions as the master device, control through communications with the outside becomes easier. Moreover, in the above configuration, the rotary base control signal is superimposed on the video signal to be transmitted to the rotary base. It is thus possible to utilize the circuit configuration for a superimposed transmission (multiplex communication) suitably when the camera is allowed to function as the master device. Consequently, it is possible to provide a monitor camera device capable of utilizing the configuration for a superimposed transmission and controlling the camera and the rotary base with ease through communications with the outside.

Also, the camera may superimpose the rotary base remote control signal on a transmission signal having no captured image captured by the camera so as to be transmitted to the rotary base control unit without sending the captured image to the rotary base control unit. According to this configuration, an image captured by the camera is not sent to the rotary base control unit from the camera. Nevertheless, the rotary base remote control signal is sent to the rotary base control unit by utilizing the function of the superimposition unit as described above. Hence, a signal on which the control signal is superimposed while including no image picked up by the camera is transmitted. A blank video signal may be transmitted. A video captured by the camera is sent out separately using the outside communication unit as described above. According to this configuration, while a captured image is not sent, a video signal is used for a superimposed transmission of the control signal. It is thus possible to utilize the circuit configuration for a superimposed transmission suitably. The captured image in the camera may be transmitted to the rotary base control unit within the scope of the invention. The captured image may be used appropriately in the rotary base control unit or it may be ignored without being used.

Also, a master transmission period during which a master device transmits transmission data and a slave return period during which a slave device transmits return data may be set, so that the camera transmits the transmission data to the rotary base control unit during the master transmission period, and the rotary base control unit transmits the return data to the camera during the slave return period.

According to this configuration, the rotary base control unit receives the transmission data during the master transmission period and transmits the return data during the slave return period. It thus operates as the slave device as well as the monitor camera device in the related art. On the contrary, the camera transmits the transmission data during the master transmission period and receives the return data during the slave return period. The data transmission and reception periods are reversed in comparison with the operations of the slave device in the related art. Accordingly, the control direction is changed, which allows the camera to operate as the master device. As has been described, by reversing the data transmission and reception periods of the camera, it is possible to allow the camera to function as the master device using the configuration for a superimposed transmission.

Also, the monitor camera device may include a mode setting unit configured to set a camera master mode and a camera slave mode, so that, in the camera master mode, the camera receives the camera remote control signal and the rotary base remote control signal from the outside communication unit and superimposes the rotary base remote control signal on the video signal so as to be transmitted to the rotary base control unit, and, in the camera slave mode, the camera and the rotary base control unit receive the camera remote control signal and the rotary base remote control signal which are superimposed on the video signal from a system controller.

According to this configuration, it is possible to set the camera master mode in which the camera serves as the master device and the camera slave mode in which the camera serves as the slave device as in the related art. In the camera maser mode, the circuit configuration for a superimposed transmission is utilized for the control through communications with the outside, and the control signal is transmitted to the rotary base control unit from the camera. In the camera slave mode, the circuit configuration for a superimposed transmission is utilized to handle the camera as the slave device as in the related art, and the control signal is sent to the camera from the system controller. As has been described, both the control similar to the related art and the control through communications with the outside can be executed using the circuit configuration for a superimposed transmission. It is thus possible to provide a useful monitor camera device.

Further, a master transmission period during which a master device transmits transmission data and a slave return period during which a slave device transmits return data may be set, so that the camera may transmit the transmission data during the master transmission period and receive the return data during the slave return period in the camera master mode, the camera may further receive the transmission data during the master transmission period and transmit the return data during the slave return period in the camera slave mode, and the rotary base control unit may receive the transmission data during the master transmission period and transmit the return data during the slave return period in the camera master mode and in the camera slave mode.

According to this configuration, the control direction is switched by switching the data transmission and reception periods of the camera, and the camera master mode and the camera slave mode are switched. As has been described, the rotary base control unit uses the data transmission and reception periods in the same manner in either the camera master mode or the camera slave mode. The camera master mode and the camera slave mode can be therefore switched easily.

Also, the camera may send out a sound signal to the rotary base control unit together with the video signal and the rotary base remote control signal, and the rotary base control unit outputs the sound signal. According to this configuration, the sound signal can be transmitted, too.

Also, the rotary base control unit may send out the sound signal to the camera, and the outside communication unit of the camera may send out the sound signal. According to this configuration, the sound signal can be transmitted, too.

Also, a power supply circuit may be provided to the rotary base control unit while the camera and the rotary base control unit are connected to each other via a coaxial cable, and an output of the power supply circuit and the video signal on which the rotary base remote control signal is superimposed are transmitted via the coaxial cable. According to this configuration, because power can be supplied to the camera from the rotary base, the configuration can be further simpler.

Another aspect is a control method for a monitor camera device having a camera and a rotary base control unit configured to be connected to each other and capable of transmitting a video signal between the camera and the rotary base control unit within the monitor camera device, wherein the camera sends out the video signal to an outside of the monitor camera device, receives a camera remote control signal and a rotary base remote control signal from the outside of the monitor camera device, controls the camera according to the camera remote control signal, and superimposes the rotary base remote control signal on a video signal to be transmitted to the rotary base control unit within the monitor camera device, and wherein the rotary base control unit extracts the rotary base remote control signal from the video signal on which the rotary base remote control signal is superimposed, and controls a rotary base according to the rotary base remote control signal. According to this configuration, the advantages described above can be achieved as well.

Still another aspect is a program for being executed by a computer of a camera in a monitor camera device including the camera and a rotary base control unit that are connected to each other and capable of transmitting a video signal between the camera and the rotary base control unit within the monitor camera device, whereby the computer performs processes of: sending out the video signal to an outside of the monitor camera device by means of an outside communication unit provided to the camera, acquiring a camera remote control signal and a rotary base remote control signal received at the outside communication unit from the outside of the monitor camera device, controlling the camera according to the camera remote control signal, and superimposing the rotary base remote control signal on a video signal to be transmitted to the rotary base control unit within the monitor camera device. According to this configuration, the advantages described above can be achieved as well.

Still another aspect is a camera for being connected to a rotary base, including: an outside communication unit configured to send out a video signal to an outside of the camera and receives a camera remote control signal and a rotary base remote control signal from the outside of the camera; a camera control unit configured to control the camera according to the camera remote control signal; and a superimposition unit configured to superimpose the rotary base remote control signal on a video signal to be transmitted to the rotary base from the camera. According to this configuration, the advantages described above can be achieved as well.

According to the invention, as has been described, it is possible to control both the camera and the rotary base with ease through communications with the outside by utilizing the circuit configuration for a superimposed transmission.

Hereinafter, monitor camera devices according to embodiments of the invention will be described using the drawings.

FIG. 1 shows a monitor camera device 10 according to a first embodiment. Referring to FIG. 1, a camera housing 12 is mounted on a rotary base 14. The camera housing 12 includes a camera 16, a zoom lens 18, a wiper 20, and a heater 22. The camera 16 is a monitor camera. The wiper 20 is configured to wipe the aperture of the camera housing 12. The heater 22 is provided to prevent formation of dew condensation on the aperture. The rotary base 14 includes a pan motor 24, a tilt motor 26, and a rotary base receiver 28.

The camera 16 includes a control unit 40, an imaging unit 42, a camera power supply 44, an operation unit 46, a display unit 48, a web server 50, and a video signal circuit 52. The control unit 40 controls the camera entirely. The imaging unit 42 includes an imaging device or the like and generates a video signal. The camera power supply 44 supplies power to the respective components of the camera 16. The camera power source 44 is configured to supply a small current. The operation unit 46 comprises switches, buttons and so forth, and is provided to input various instructions to the camera 16. The display unit 48 displays an operation menu for the operation unit 46 or the like.

The web server 50 functions as an outside communication unit and makes communications with a personal computer 60. In this embodiment, the web server 50 is connected to the personal computer 60 via the Internet. An IP address is allocated to the camera 16 to enable the IP protocol communication. The personal computer 60 includes a display unit 62 and an operation unit 64. A web browser 66 is incorporated into the personal computer 60. The user is allowed to access the web server 50 of the camera 16 through operations on the personal computer 60.

The outside communication function may be achieved by a network other than the Internet, or it may be achieved by any other communication scheme. The outside communication function may be achieved by a serial communication. To be more specific, the outside communication function may be achieved, for example, by a RS232C, RS422, RS485, USB, IEEE802.3, or IEEE802.11 interface.

The video signal circuit 52 is a circuit to send a video signal to the rotary base receiver 28. The video signal circuit 52 has a function of making communications with the rotary base receiver 28. The video signal circuit 52 and the rotary base receiver 28 are connected to each other via a coaxial cable 30. The video signal circuit 52 has a function of superimposing a control signal on a video signal, and a further function of separating the control signal superimposed on the video signal so as to extract the control signal. The video signal circuit 52 may have the circuit configuration for a superimposed transmission in the related art.

As has been described, the rotary base receiver 28 has the function of making communications with the video signal circuit 52. As with the video signal circuit 52, the rotary base receiver 28 has the function of superimposing a control signal on a video signal to be transmitted, and has a function of separating the control signal superimposed on the video signal so as to extract the control signal. The rotary base receiver 28 may also have a circuit configuration for a superimposed transmission in the same manner as the one in the related art.

The rotary base receiver 28 corresponds to one embodiment of the rotary base control unit. The rotary base receiver 28 controls the rotary base 14 so as to turn around the camera housing 12 together with the rotary base 14. The rotary base receiver 28 includes a rotary base power supply 54, and controls a supply of a current to the pan motor 24 and the tilt motor 26, by which the rotary base 14 is controlled.

The rotary base receiver 28 is also connected to the zoom lens 18, the wiper 20 and the heater 22 of the camera housing 12, and supplies power from the rotary power supply 54 to control the operations of these components. The rotary base power supply 54 is a power supply for a large current. The rotary base receiver 28 is responsible for the control on devices that need a large current as specified above. The rotary base receiver 28 controls these components according to a control signal received from the video signal circuit 52.

Also, the rotary base receiver 28 is connected to an alarm detector 70, a speaker 72, and a microphone 74. The alarm detector 70 is attached, for example, to a door, and detects the occurrence of an alarm event.

Operations of the monitor camera device 10 of this embodiment will now be described. The imaging unit 42 of the camera 16 generates a video signal and supplies the video signal to the control unit 40. The video signal is then supplied to the web server 50 from the control unit 40 and transmitted to the personal computer 60 from the web server 50. A video is displayed on the browser screen at the personal computer 60.

At the personal computer 60, a remote control instruction is inputted using the browser function, and a remote control signal is transmitted to the web server 50 of the camera 16 over the Internet. Herein, the remote control signal is in the form of data sent over the Internet. The remote control signal includes a camera remote control signal and a rotary base remote control signal. The web server 50 supplies the camera remote control signal and the rotary base remote control signal to the control unit 40.

Upon receipt of the camera remote control signal, the control unit 40 controls the camera 16 according to the camera remote control signal. For example, the setting and operations of the imaging unit 42 are controlled.

Figure 2:
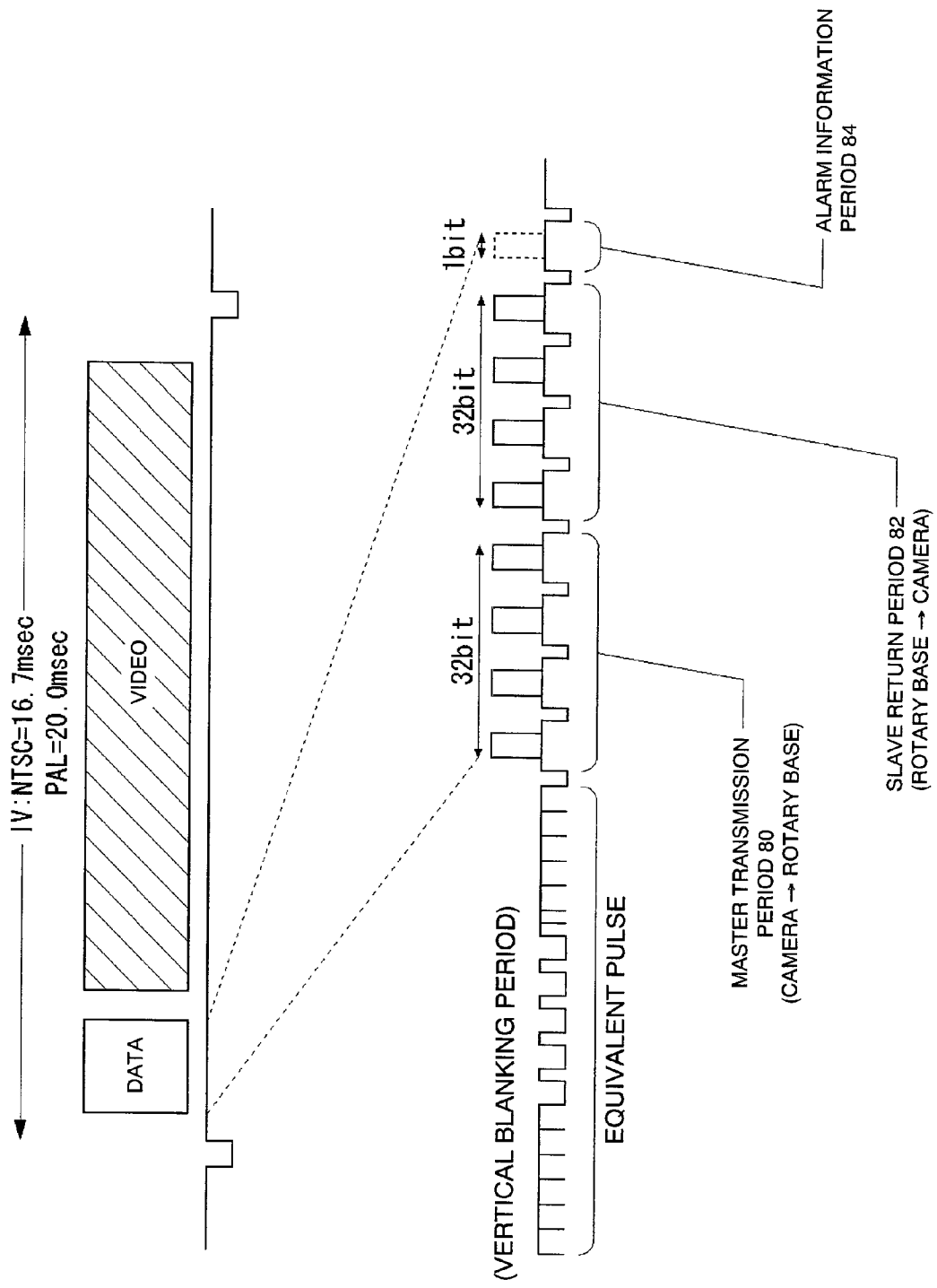
FIG. 2 is a view showing a form of superimposition of a video signal and a control signal.

Also, upon receipt of the rotary base remote control signal, the control unit 40 functions as a conversion unit, and thereby converts the rotary base remote control signal to a signal for a data unit in FIG. 2. The converted rotary base remote control signal is supplied to the video signal circuit 52.

In the video signal circuit 52, the rotary base remote control signal is superimposed on a video signal. The rotary base remote control signal together with the video signal is then sent to the rotary base receiver 28. A synchronous signal may be sent between the video signal circuit 52 and the rotary base receiver 28.

Herein, the video signal generated in the imaging unit 42 may not be supplied to the video signal circuit 52. The video signal circuit 52 transmits a video signal that does not include a captured image. This video signal can be a blank video signal having no actual image. The rotary base remote control signal is superimposed on such a blank video signal.

In this case, the video signal is used not for sending a video, but for performing a superimposed transmission of the control signal. Thus, it possible to utilize the circuit configuration for a superimposed transmission in the related art for a transmission of the control signal. In the scope of the invention, a signal of an actual captured image may be transmitted. The actual captured image may be used on the rotary base side or it may be discarded.

In the rotary base receiver 28, the rotary base remote control signal is extracted from the video signal by being separated therefrom. The rotary base receiver 28 then controls the rotary base 14 according to the rotary base remote control signal. In this instance, the rotary base receiver 28 functions as the extraction unit and the rotary base control unit of the invention.

The rotary base remote control signal includes instructions of a pan operation and a tilt operation. The pan operation is a turning in the horizontal direction and the tilt operation is a turning in the vertical direction. The rotary base receiver 28 activates the rotary base 14 by controlling a supply of a current from the rotary base power supply 54 to the pan motor 24 and the tilt motor 26 according to the rotary base remote control signal.

The zoom lens 18, the wiper 20, and the heater 22 are controlled in the same manner as that the rotary base 14 is controlled. More specifically, a lens remote control signal, a wiper remote control signal, and a heater remote control signal are included in the rotary base remote control signal. As has been described above, these control signals are sent to the camera 16 from the personal computer 60 and then to the rotary base receiver 28 from the camera 16. Herein, the control signals are converted to be superimposed on the video signal. The rotary base receiver 28 extracts the lens remote control signal, the wiper remote control signal, and the heater remote control signal, and controls the respective components to be controlled according to these control signals.

In the monitor camera device 10 of this embodiment, a sound may be transmitted, too. A sound signal is inputted into the microphone of the personal computer 60, and sent to the web server 50 of the camera 16 from the personal computer 60. The sound signal is then supplied to the video signal circuit 52 via the control unit 40. The video signal circuit 52 transmits the sound signal together with the video signal and the rotary base remote control signal to the rotary base receiver 28 via the coaxial cable 30. The sound signal may be superimposed on the video signal. The rotary base receiver 28 separates and decodes the sound signal, after which it outputs the resulting sound signal from the speaker 72.

In addition, a sound in the monitor area is inputted into the microphone 74. The sound signal is supplied to the rotary base receiver 28, and sent to the video signal circuit 52 of the camera 16 from the rotary base receiver 28 via the coaxial cable 30. The sound signal is sent to the web server 50 via the control unit 40 and then to the personal computer 60 from the web server 50, and outputted from the speaker of the personal computer 60.

Also, in the monitor camera device 10 of this embodiment, information about the occurrence of an alarm is transmitted, too. When the alarm detector 70 detects the occurrence of an alarm event, a detection signal is inputted into a contact of the input terminal of the rotary base receiver 28. The rotary base receiver 28 sends information indicating the occurrence of an alarm event to the video signal circuit 52 of the camera 16. The information about the alarm event is sent to the control unit 40 and then to the personal computer 60 from the control unit 40 via the web server 50. Also, the control unit 40 controls the camera 16 in response to the alarm event.

In this embodiment, contact input information other than the contact input information about an alarm may be sent to the camera 16 from the rotary base receiver 28 in the same manner. Information of general contact input is transmitted suitably.

The master/slave relation between the camera 16 and the rotary base control unit 28 in the monitor camera device 10 of this embodiment will now be described. In this embodiment, as described, the camera 16 acquires information about the rotary base remote control via the Internet. The camera 16 then generates a rotary base remote control signal at a predetermined frequency to be superimposed on the video signal according to the acquired information. The camera 16 thus serves as the master device and functions as the system controller. The rotary base receiver 28 therefore serves as a slave device.

The Internet communication is made by the camera 16. An IP address is allocated to the camera 16. The camera 16 is accessed through the Internet. Because the rotary base receiver 28 is controlled by the camera 16, there is no need to allocate an IP address and a MAC address to the rotary base receiver 18. It is thus possible to also control the rotary base through a host authentication or a user authentication by the camera 16. In other words, both the camera control and the rotation control can be permitted simultaneously through a single host authentication or a single user authentication.

It is therefore sufficient for the user to obtain a single authentication permission for a set of the camera 16 and the rotary base receiver 28. The user is thus able to operate the functions of camera without having to register and authenticate plural addresses. As a result, the user is able to handle the camera 16 and the rotary base 14 as one unit and access to these components through the web browser.

FIG. 2 shows superimposition of the videos signal and the control signal in this embodiment. The control signal is superimposed on the video signal in a vertical blanking period (vertical fly-back period). A master transmission period 80 and a slave return period 82 are set in the vertical blanking period. The master transmission period is an area where the master device transmits transmission data (first half data) to the slave device. The slave return period is an area where the slave device transmits return data (second half data) to the master device. The length of the master transmission period 80 and the slave return period 82 is equivalent to 4 H. A data volume of each of the transmission data and the return data is 32 bits.

In this embodiment, transmission data is superimposed on a video signal and transmitted to the rotary base receiver 28 from the camera 16 during the master transmission period 80. During the slave return period 82, return data is transmitted to the camera 16 from the rotary base receiver 28. Accordingly, the camera 16 operates as the master device and the rotary base receiver 28 operates as the slave device.

The system of this embodiment will now be compared with the system in the related art. The master transmission period and the slave return period are set in the system in the related art in the same manner. It should be noted, however, that both the camera 16 and the rotary base receiver 28 serve as the slave devices in the system in the related art. Both the camera 16 and the rotary base receiver 28 receive transmission data from the system controller during the master transmission period and transmit return data during the slave return period.

On the contrary, in this embodiment, the rotary base receiver 28 is the slave device and operates in the same manner as in the related art. Regarding the camera 16, however, data transmission and reception periods are reversed in the first and second halves. This changes the control direction and allows the camera 16 to operate as the master device.

As has been described, the configuration for a superimposed transmission of the camera 16 and the rotary base control unit 28 can be used in this embodiment. A change reversing the data transmission and reception periods of the camera 16 is made. This allows the camera 16 to function as the master device.

Referring to FIG. 2, an alarm information period 84 is set after the slave return period 82 in the vertical blanking period. The alarm information period 84 is a period during which alarm information is transmitted. The alarm information period is equivalent to 1 H, and the alarm information is a signal of at least 1 bit.

The alarm information reflects information at the input terminal contact of the rotary base receiver 28. As has been described, the alarm detector 70 is connected to the rotary base receiver 28. When the alarm detector 70 detects the occurrence of an alarm state, a detection signal is inputted into the input terminal. In this instance, the rotary base receiver 28 switches ON the alarm bit (presence of alarm: 1). The camera 16 acquires the information about the alarm bit by means of polling. Accordingly, the information of the alarm contact input is sent to the camera 16.

The description about the transmission data and the return data can apply to the alarm information. In other words, the rotary base receiver 28 operates in the same manner as in the related art regarding the alarm information. It should be noted, however, that the alarm information is taken into the system controller serving as the master device in the system in the related art. On the contrary, in the system of this embodiment, the alarm information is taken into the camera 16 serving as the master device. As has been described, in this embodiment, the camera 16 is allowed to function as the master device suitably regarding the alarm information by utilizing the configuration in the related art suitably.

The monitor camera device 10 according to the first embodiment has been described. According to the monitor camera device 10 of this embodiment, the camera 16 receives the camera remote control signal and the rotary base remote control signal through communications with the outside, and converts the rotary base remote control signal so as to be superimposed on a video signal for the resulting signal to be transmitted to the rotary base receiver 28. Accordingly, the camera 16 functions as the master device, which makes the control through communications with the outside easier. Moreover, because the camera 16 is allowed to function as the master device, the circuit configuration for a superimposed transmission can be utilized suitably. In this manner, it is possible to provide the monitor camera device 10 capable of utilizing the configuration for a superimposed transmission and controlling the camera and the rotary base with ease through communications with the outside.

To be more specific, in this embodiment, the camera 16 is not formed integrally with the rotary base 14 in the network camera. Nevertheless, the standalone camera 16 serves as the web server and performs an image transmission. Further, the camera 16 controls the rotary base 14 with different power supply from that of the camera 16, and manages the user through a host authentication or the like. The camera and the rotary base control device are therefore managed as devices having a single IP address (or host name). It is thus possible to control the camera and the rotary base separating with each other through a single authentication. The camera and the rotary base separating with each other can be controlled as a compound camera integrally comprising a rotary base with a lens and a camera.

Also, in the monitor camera device 10 of this embodiment, the camera 16 transmits the rotary base remote control signal to the rotary base receiver 28 without transmitting a video signal picked up by the camera 16. The control signal is sent by utilizing the function of the superimposed transmission circuit. The control signal is superimposed on a video signal including no captured image in the camera. As has been described, a blank video signal can be used instead. In this manner, although a captured image in the camera is not sent, a video signal is used for the control signal to be superimposed thereon. It is thus possible to utilize the circuit configuration for a superimposed transmission suitably.

In the monitor camera device 16 of this embodiment, as has been described using FIG. 2, the camera transmits transmission data to the rotary base control unit during the master transmission period. Then, the rotary base control unit transmits return data to the camera during the slave return period. By reversing the data transmission and reception periods of the camera, it is possible to allow the camera to function as the master device utilizing the configuration for a superimposed transmission.

Also, according to the monitor camera device 10 of this embodiment, a sound is transmitted to the rotary base receiver 16 from the camera 16 and a sound is also transmitted in a reversed direction. It is thus possible to transmit a sound suitably, too.

The zoom lens 18 is provided in this embodiment. However, other lenses may be provided as well. For example, a focus moving lens, a fixed-focus lens, or a manual focusing lens (manual zoom lens) may be provided.

A connection between the camera 16 and the rotary base receiver 28 may be established by means other than a coaxial cable. For example, a twist cable may be used.

A network compound camera comprising a rotary base, a lens, and a housing integrally may also have the configuration similar to this embodiment. In this case, too, the camera and the rotary base can be controlled suitably as described above. Overlapping functions of the rotary base receiver can be halted or discarded. For example, the circuit for lens control of the rotary base receiver may be halted.

A second embodiment will now be described. A monitor camera device of this embodiment has a configuration similar to the first embodiment shown in FIG. 1. It should be noted, however, that this embodiment is configured to enable switching between a camera master mode and a camera slave mode. In the camera master mode, as described in the first embodiment, the camera 16 serves as the master device. In the camera slave mode, the camera 16 serves as the slave device in the same manner as the system in the related art. Hereinafter, descriptions of points common with the first embodiment will be omitted where appropriate.

The camera master mode and the camera slave mode are set by the control unit 40 of the camera 16. The control unit 40 displays a mode selection menu on the display unit 48. The camera master mode and the camera slave mode are displayed in the mode selection menu. An instruction for a mode selection is inputted through operations on the operation unit 46. The control unit 40 then sets the camera master mode or the camera slave mode according to the mode selection operations.

Figure 3:
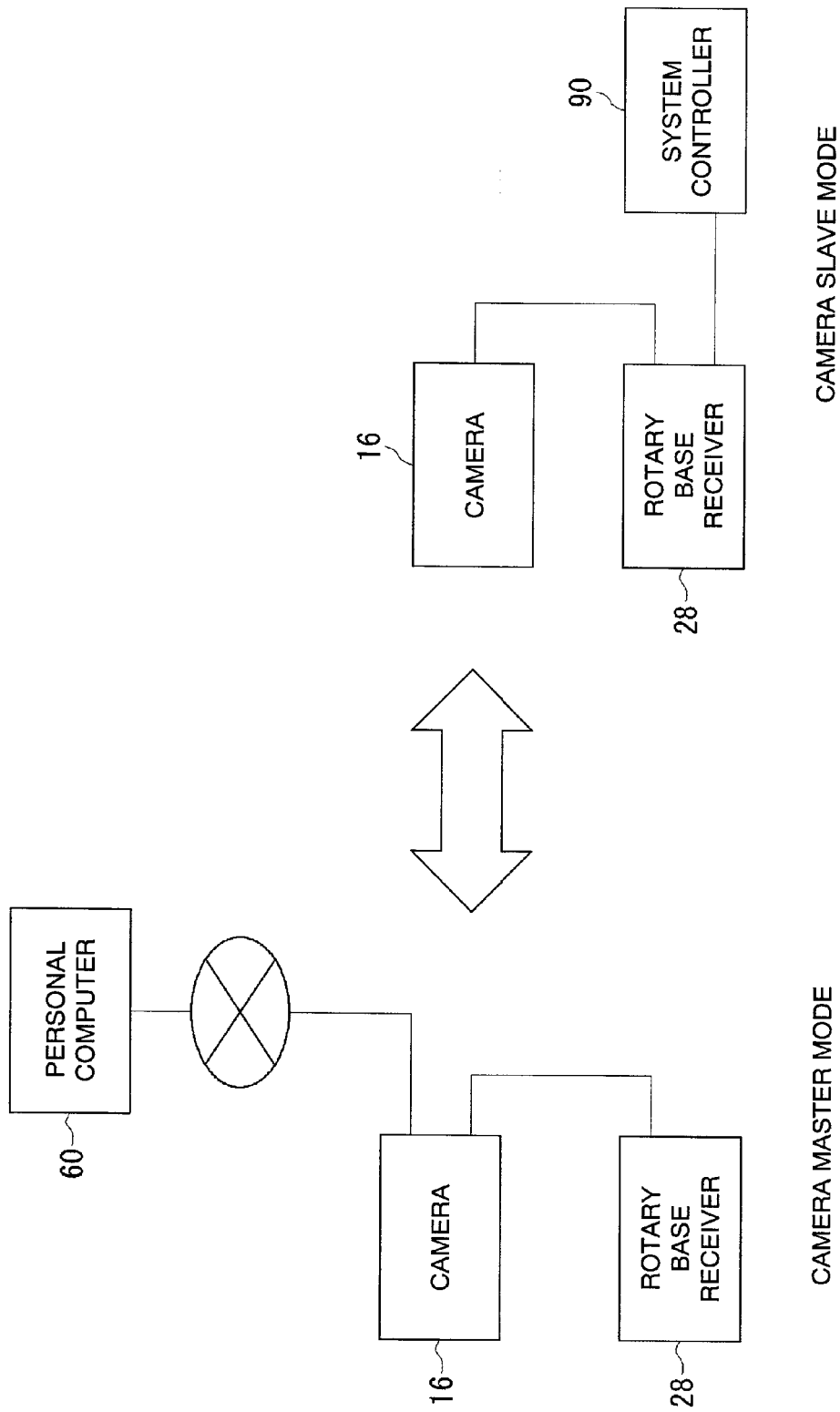
FIG. 3 is a view showing a connection form between devices in a camera master mode and a camera slave mode according to a second embodiment of the invention.

FIG. 3 shows a connection form in the camera master mode and the camera slave mode. A connection form between the camera 16 and the rotary base receiver 28 is the same between in the camera master mode and in the camera slave mode. It should be noted, however, that in the camera master mode, the camera 16 is connected to the personal computer 60 over the Internet as described in the first embodiment. Meanwhile, in the camera slave mode, the camera 16 and the rotary base receiver 28 are cascade connected to the system controller 90 in the same manner as in the system in the related art of FIG. 6.

Operations in each mode will now be described. In the camera master mode, the monitor camera device 10 operates in the same manner as in the first embodiment. More specifically, the camera 16 receives the camera remote control signal and the rotary base remote control signal from the personal computer 60, and superimposes the rotary base remote control signal on a video signal for the resulting signal to be sent to the rotary base receiver 28.

Figure 6:
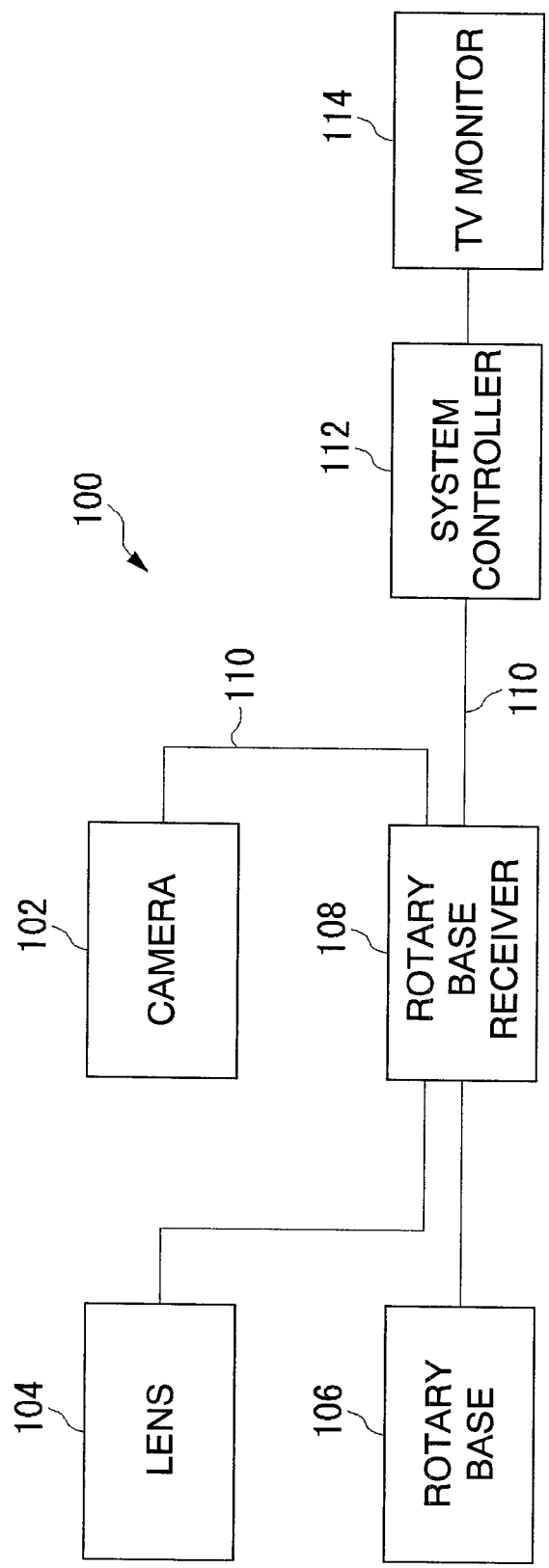
FIG. 6 is a block diagram showing the configuration of a monitor camera device in the related art.

In the camera slave mode, the monitor camera device 10 functions in the same manner as in the system in the related art of FIG. 6. The system controller 90 serves as the master device, and the camera 16 and the rotary base receiver 28 serve as the slave devices. A video signal is sent to the system controller 90 from the camera 16 via the rotary base receiver 28. A control signal to the camera and a control signal to the rotary base are superimposed on the video signal, and sent to the camera 16 and the rotary receiver 28 from the system controller 90.

Figure 4:
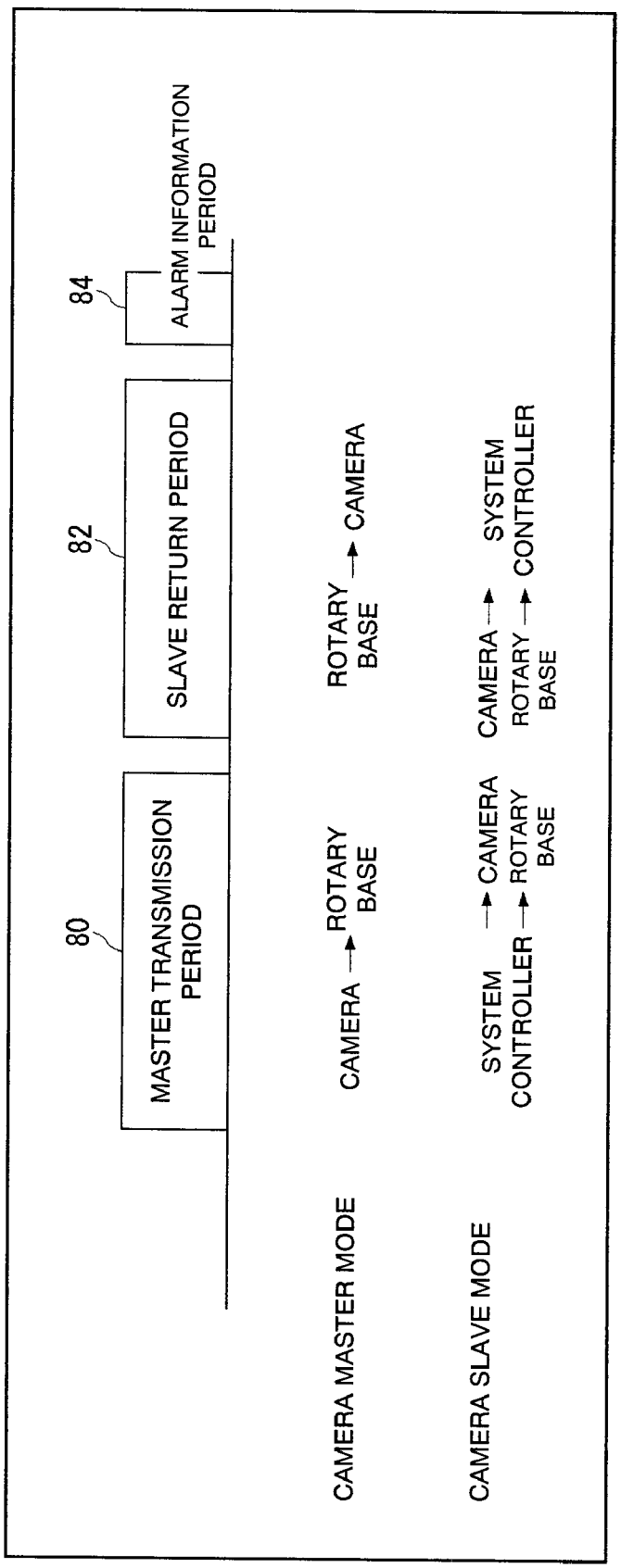
FIG. 4 is a view showing a transmission and a reception of a control signal in the camera master mode and the camera slave mode.

FIG. 4 shows a transmission and a reception of a control signal in the camera master mode and the camera slave mode. Switching of modes can be achieved as the control unit 40 of the camera 16 performs switching shown in FIG. 4.

As has been described, the master transmission period and the slave return period are set in the vertical blanking period of a video signal. The master transmission period is an area where the master device transmits transmission data (the first half data). The slave return period is an area where the slave device transmits return data (the second half data). In a case where no video is sent, the master transmission period and the slave return period may be set by utilizing a vertical synchronous signal alone.

Referring to FIG. 4, in the camera master mode, the camera 16 transmits transmission data to the rotary base receiver 28 during the master transmission period. Then, the rotary base receiver 28 transmits return data to the camera 16 during the slave return period. These transmission and reception are similar to the transmission and reception in the first embodiment described with reference to FIG. 2.

On the contrary, in the camera slave mode, the system controller 90 transmits transmission data to the camera 16 and the rotary base receiver 28 during the master transmission period. The transmission data is sent to the camera 16 via the rotary base receiver 28. During the slave return period, the camera 16 and the rotary base receiver 28 transmit return data to the system controller 90.

A comparison between the camera master mode and the camera slave mode reveals that the operations of the rotary base receiver 28 are the same. The data transmission and reception periods of the camera 16 are switched. As has been described, by switching the data transmission and reception periods of the camera 16, it is possible to use the monitor camera device 10 in system configuration similar to the related art.

In the configuration described above, the camera 16 is used together with the rotary base receiver 28 in the camera slave mode. Besides this configuration, a camera slave mode in which the camera 16 is used independently may be set.

As has been described, according to the second embodiment, it is possible to set the camera master mode in which the camera 16 serves as the master device and the camera slave mode in which the camera 16 serves as the slave device as in the related art. Both of the same control as in the related art and the control through communications with the outside can be therefore executed using the circuit configuration for a superimposed transmission. It is thus possible to provide a useful monitor camera device by utilizing the circuit configuration for a superimposed transmission suitably.

Also, according to this embodiment, as has been described, the control direction is changed by switching the data transmission and reception periods of the camera 16, and the camera master mode and the camera slave mode are switched. The rotary base control unit can use the data transmission and reception periods whether the camera master mode or the camera slave mode. The camera master mode and the camera slave mode can be therefore switched easily.

A third embodiment will now be described. A monitor camera device of this embodiment has a configuration similar to the configuration in the first embodiment shown in FIG. 1. Hereinafter, descriptions of points common with the first embodiment will be omitted where appropriate.

In the first embodiment, the camera 16 is provided with the camera power supply 44. Power is supplied to the camera 16 from the camera power supply 44. On the contrary, in this embodiment, power from the rotary base power supply 54 of the rotary base receiver 28 is sent to the camera 16 from the rotary base receiver 28 via the coaxial cable 30. In this instance, the power is multiplexed with the video signal and the control signal. A power current, the video signal, and the control signal are therefore sent via the coaxial cable 30. In the camera 16, the video signal and the control signal are separated from the power. As has been described, a sound signal may be transmitted, too.

Figure 5:
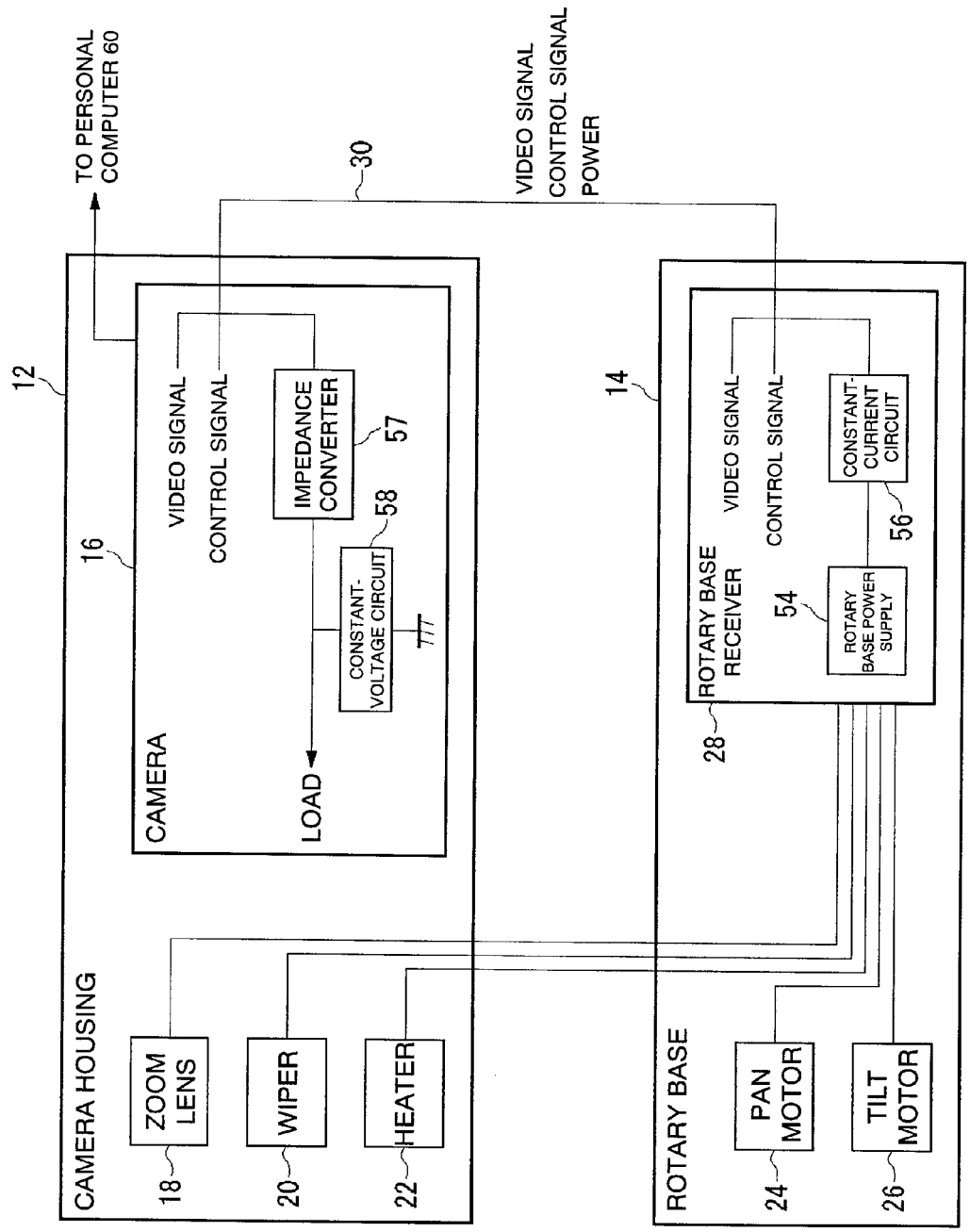
FIG. 5 is a block diagram showing the configuration of a monitor camera device according to a third embodiment of the invention.

FIG. 5 schematically shows the configuration to supply power to the camera 16 from the rotary base 14. In the rotary base 14, the rotary base receiver 28 includes the rotary base power supply 54 and a constant-current circuit 56. The camera 16 includes an impedance converter 57 and a constant-voltage circuit 58. The rotary base power supply 54 is a direct current power supply. The constant-current circuit 56 converts direct current power to constant-current power. The converted current is sent to the camera 16 via the coaxial cable 30. In the camera 16, the impedance converter 57 converts the direct current power to power at low impedance. The constant-voltage circuit 58 converts the direct current power to stable, constant-voltage power. The constant-voltage power is thus supplied to the load of the camera 16.

In the first embodiment, power from the rotary base power supply 54 is supplied to the zoom lens 18, the wiper 20, and the heater 22 by bypassing the coaxial cable 30. This configuration may be applied to this embodiment, too. In other words, devices that need a large current may be supplied with a current directly by bypassing the coaxial cable 30.

As has been described, according to the third embodiment, because power can be supplied to the camera from the rotary base, the configuration can be further simpler.

While preferred embodiments of the invention that are conceivable at this point in the present time have been described, it should be appreciated that various modifications are possible to the embodiments of the invention, and all of such modifications within the true sprit and the scope of the invention are intended to be included in the scope of the appended claims.

INDUSTRIAL APPLICABILITY

As has been described, the monitor camera device of the invention achieves an advantage that the configuration for a superimposed transmission can be utilized and both the camera and the rotary base can be controlled with ease through communications with the outside. The invention is therefore useful as a monitor camera device or the like.

The invention claimed is:

1. A monitor camera device including a camera and a rotary base control unit connected to the camera and capable of transmitting a video signal between the camera and the rotary base control unit within the monitor camera device, wherein
   the camera comprises:
   an outside communication unit configured to send out the video signal to an outside of the monitor camera device and receive a camera remote control signal and a rotary base remote control signal from the outside of the monitor camera device;
   a camera control unit configured to control the camera according to the camera remote control signal; and
   a superimposition unit configured to superimpose the rotary base remote control signal on a video signal to be transmitted to the rotary base control unit within the monitor camera device, wherein
   the rotary base control unit includes an extraction unit configured to extract the rotary base remote control signal from the video signal on which the rotary base remote control signal is superimposed, and controls a rotary base according to the rotary base remote control signal.

2. The monitor camera device according to claim 1, wherein
   the camera superimposes the rotary base remote control signal on a transmission signal having no captured image of the camera so as to be transmitted to the rotary base control unit without sending the captured image to the rotary base control unit.

3. The monitor camera device according to claim 1, wherein
a master transmission period during which a master device transmits transmission data and a slave return period during which a slave device transmits return data are set; and
the camera transmits the transmission data to the rotary base control unit during the master transmission period, and the rotary base control unit transmits the return data to the camera during the slave return period.

4. The monitor camera device according to claim 1, further comprising:
a mode setting unit configured to set a camera master mode and a camera slave mode, wherein
in the camera master mode, the camera receives the camera remote control signal and the rotary base remote control signal from the outside communication unit and superimposes the rotary base remote control signal on the video signal so as to be transmitted to the rotary base control unit, and
in the camera slave mode, the camera and the rotary base control unit receive the camera remote control signal and the rotary base remote control signal which are superimposed on the video signal from a system controller.

5. The monitor camera device according to claim 4, wherein
a master transmission period during which a master device transmits transmission data and a slave return period during which a slave device transmits return data are set,
the camera transmits the transmission data during the master transmission period and receives the return data during the slave return period in the camera master mode,
the camera further receives the transmission data during the master transmission period and transmits the return data during the slave return period in the camera slave mode, and
the rotary base control unit receives the transmission data during the master transmission period and transmits the return data during the slave return period in the camera master mode and in the camera slave mode.

6. The monitor camera device according to claim 1, wherein
the camera sends out a sound signal to the rotary base control unit together with the video signal and the rotary base remote control signal, and
the rotary base control unit outputs the sound signal.

7. The monitor camera device according to claim 1, wherein
the rotary base control unit sends out a sound signal to the camera, and the outside communication unit of the camera sends out the sound signal.

8. The monitor camera device according to claim 1, wherein
a power supply circuit is provided to the rotary base control unit,
the camera and the rotary base control unit are connected to each other via a coaxial cable, and
an output of the power supply circuit and the video signal on which the rotary base remote control signal is superimposed are transmitted via the coaxial cable.

9. A control method for a monitor camera device including a camera and a rotary base control unit configured to be connected to each other and capable of transmitting a video signal between the camera and the rotary base control unit within the monitor camera device, wherein
the camera sends out the video signal to an outside of the monitor camera device, receives a camera remote control signal and a rotary base remote control signal from the outside of the monitor camera device, controls the camera according to the camera remote control signal, and superimposes the rotary base remote control signal on a video signal to be transmitted to the rotary base control unit within the monitor camera device, and
the rotary base control unit extracts the rotary base remote control signal from the video signal on which the rotary base remote control signal is superimposed, and controls a rotary base according to the rotary base remote control signal.

10. A camera for being connected to a rotary base, comprising:
an outside communication unit configured to send out a video signal to an outside of the camera and receives a camera remote control signal and a rotary base remote control signal from the outside of the camera;
a camera control unit configured to control the camera according to the camera remote control signal; and
a superimposition unit configured to superimpose the rotary base remote control signal on a video signal to be transmitted to the rotary base from the camera.

* * * * *